United States Patent
Yasui

[11] Patent Number: 5,431,063
[45] Date of Patent: Jul. 11, 1995

[54] TORQUE DETECTOR AND TORQUE DETECTING ELEMENT

[75] Inventor: Katsuaki Yasui, Hyogo, Japan

[73] Assignee: Mitsubishi Denki Kabushiki Kaisha, Tokyo, Japan

[21] Appl. No.: 147,546

[22] Filed: Nov. 5, 1993

[30] Foreign Application Priority Data

Nov. 6, 1992 [JP] Japan .................. 4-296819
Mar. 30, 1993 [JP] Japan .................. 5-071712

[51] Int. Cl.⁶ ............................. G01L 3/10
[52] U.S. Cl. .................. 73/862.333; 73/862.336; 73/779
[58] Field of Search .......... 73/862.336, DIG. 2, 73/779, 862.36, 862.333

[56] References Cited

U.S. PATENT DOCUMENTS

| | | | |
|---|---|---|---|
| 4,590,807 | 5/1986 | Kobayashi et al. | 73/862.36 |
| 4,817,444 | 4/1989 | Yagi et al. | 73/DIG. 2 |
| 4,899,598 | 2/1990 | Gumaste et al. | 73/DIG. 2 |
| 4,939,937 | 7/1990 | Klauber et al. | 73/862.36 |
| 4,986,137 | 1/1991 | Sato et al. | 73/862.36 |
| 5,092,182 | 3/1992 | Ikeda et al. | 73/862.36 |
| 5,144,846 | 9/1992 | Klauber et al. | 73/862.336 |
| 5,146,790 | 9/1992 | Fish | 73/862.336 |

FOREIGN PATENT DOCUMENTS

| | | |
|---|---|---|
| 0090501 | 10/1983 | European Pat. Off. . |
| 0330311 | 8/1989 | European Pat. Off. . |
| 1201582 | 4/1954 | Germany . |
| 4011766 | 10/1990 | Germany . |
| 61-102530 | 5/1986 | Japan . |

Primary Examiner—Richard E. Chilcot, Jr.
Assistant Examiner—Jewel V. Artis
Attorney, Agent, or Firm—Sughrue, Mion, Zinn, Macpeak & Seas; Richard C. Turner

[57] ABSTRACT

The improved torque detector comprises a driven shaft 1 provided with a magnetostrictive magnetic member 2 and two sets of inductors 5a and 5b that are each composed of current paths which are formed in such a way that current will flow in directions that are at right angles to the two directions of main stress that develops on the surface of the driven shaft 1 when it receives an applied torque. The inductors are arranged in such a way that they are superposed in substantially the same axial position on a cylindrical plane that is spaced by a predetermined gap from the surface of the magnetic member 2. The detector detects the inductances of those inductors 5a and 5b to eventually determine the applied torque. Alternatively, a bias current is preliminarily supplied to the inductors and a current is impressed on a drive coil 17 that is wound around the driven shaft 1, whereupon a current or voltage is induced in those inductors and detected by the detector, thereby determining the applied torque. The torque detector is simple in construction and yet it is capable of correct torque detection without unduly affected by disturbances such as an axial temperature gradient, unbalanced external magnetic field and residual magnetic flux.

15 Claims, 5 Drawing Sheets

TORQUE DETECTOR AND TORQUE DETECTING ELEMENT

BACKGROUND OF THE INVENTION

This invention relates to a torque detector with which the torque that is applied as an external force to a driven shaft such as a rotating shaft can be detected in a non-contact fashion.

In automotive areas such as the power steering mechanism, anti-skid braking mechanism and automatic transmission control, a need often occurs to detect the torque as it is applied to driven shafts such as the shaft of a steering wheel. An example of the torque detectors that are to be used in those applications is a magnetostrictive torque detector that has been disclosed in Unexamined Published Japanese Patent Application (kokai) Hei-1-94230. The construction of this detector is described below with reference to FIG. 10.

In the drawing, numeral 1 denotes a driven shaft which is a rotating shaft; 7a and 7b are bearings that support the driven shaft 1 rotatably; and 3 is a bobbin that is also supported by the bearings. A first magnetic member 2a and a second magnetic member 2b, each being made of a layer of a magnetostrictive material, are secured to the circumferential surface of the driven shaft 1 as they are axially spaced from each other. The first magnetic member 2a is formed as a plurality of thin stripes that are arranged at an angle ($\theta$) of 45° with respect to the center axis whereas the second magnetic member 2b is formed as a plurality of thin strips that are arranged at an angle ($\theta$) of $-45°$. The bobbin 3 is fitted with a first coil 5a and a first yoke 4a in association with the first magnetic member 2a, as well as a second coil 5b and a second yoke 4b in association with the second magnetic member 2b. The yokes 4a and 4b are members that prevent magnetic fluxes from spreading towards the outside. Shown by 100 is a stress detecting circuit that is connected to the first and second coils 5a and 5b.

The torque detector shown in FIG. 10 operates as follows. When an external torque is applied to the driven shaft 1, a main stress develops on the surface of the driven shaft in the directions defined by $\theta = \pm 45°$, whereupon a tensile component of the stress works on one of the magnetic members 2a and 2b and a compressive component of the stress works on the other. If this stress is created, the permeability of the magnetic members 2a and 2b will change and the direction of the change that occurs upon development of the tensile stress is opposite to the direction for the case where the compressive stress develops. The stress detecting circuit 100 detects the inductances of the coils 5a and 5b that develop in response to the changes in the permeability of the magnetic members, calculates the torque that has been applied to the driven shaft 1, and outputs a voltage proportional to the torque.

The thus constructed magnetostrictive torque detector has had the following problems. First, the provision of magnetic members 2a and 2b as a plurality of strips on the surface of the driven shaft 1 requires a complex procedure; furthermore, the magnetic members in the form of strips will come off easily and corrosion has occasionally developed at the boundary between the shaft 1 and each magnetic member.

In the magnetostrictive torque detector under consideration, the changes in permeability that occur in opposite directions in the magnetic member 2a disposed in the direction of $+45°$ and the magnetic member 2b disposed in the direction of $-45°$ are detected via different coils 5a and 5b; although this is effective in compensating for the temperature characteristics of the magnetic members, external magnetic field and residual magnetic flux; various disturbances such as an axial temperature gradient, unbalanced external magnetic field and residual magnetic flux cannot be fully compensated. For example, the magnetic members 2a and 2b are axially spaced from each other, so if the driven shaft 1 has an axial temperature gradient, the magnetic members can have different temperatures that will eventually cause an error in the result of inductance detection.

SUMMARY OF THE INVENTION

The present invention has been accomplished under these circumstances and has as an object providing a torque detector that is simple in construction and which yet is less vulnerable to the effects of disturbances such as an axial temperature gradient, unbalanced external magnetic field and residual magnetic flux.

The need for simple construction is satisfied by a torque detector that comprises a driven shaft that has been rendered magnetostrictive, an inductor provided on a cylindrical plane that is spaced by a predetermined gap from the surface of that portion of the driven shaft which has been rendered magnetostrictive, and an inductance detecting circuit for detecting the inductance of that inductor, in that the inductor is composed of a current path that points in the direction in which inductance changes in response to the change in the permeability of said portion of the driven shaft that has been rendered magnetostrictive.

The need for simple construction can also be attained by a torque detector that comprises a driven shaft that has been rendered magnetostrictive, an inductor that is provided on a cylindrical plane spaced by a predetermined gap from the surface of the drive shaft and which is composed of a current path that points in the direction in which inductance changes in response to the change in the permeability of the surface of the driven shaft due to the torque received by the driven shaft, a means of supplying a bias current to the inductor, a drive coil wound around the driven shaft, and a detecting circuit for detecting a current or voltage as induced in the inductor upon impression of a current on the drive coil.

The need for reducing the sensitivity to disturbances such as an axial temperature gradient can be satisfied by a torque detector using an inductor assembly consisting of a first and a second inductor that are each composed of current paths that point in the direction in which inductance changes in response to the change in permeability that occurs in the two directions of main stress line that develops on the surface of the driven shaft due to the torque it receives, which torque detector is further characterized in that said first and second inductors are placed in such a way that they are superposed in substantially the same axial position.

The need for reducing the sensitivity to disturbances such as an axial temperature gradient can also be attained by a torque sensing element that has an inductor assembly formed on a substrate, the inductor assembly consisting of a first and a second inductor that are each composed of current paths that point in the direction in which inductance changes in response to the change in permeability that occurs in the two directions of main stress line that develops on the surface of the driven shaft due to the torque it receives when the torque detecting element under consideration is placed around that portion of the driven shaft which has been rendered magnetostrictive, which torque detecting element is further characterized in that the first and second inductors are placed in such a way that they are superposed in substantially the same axial position.

DETAILED DESCRIPTION OF THE INVENTION

Figure 1:
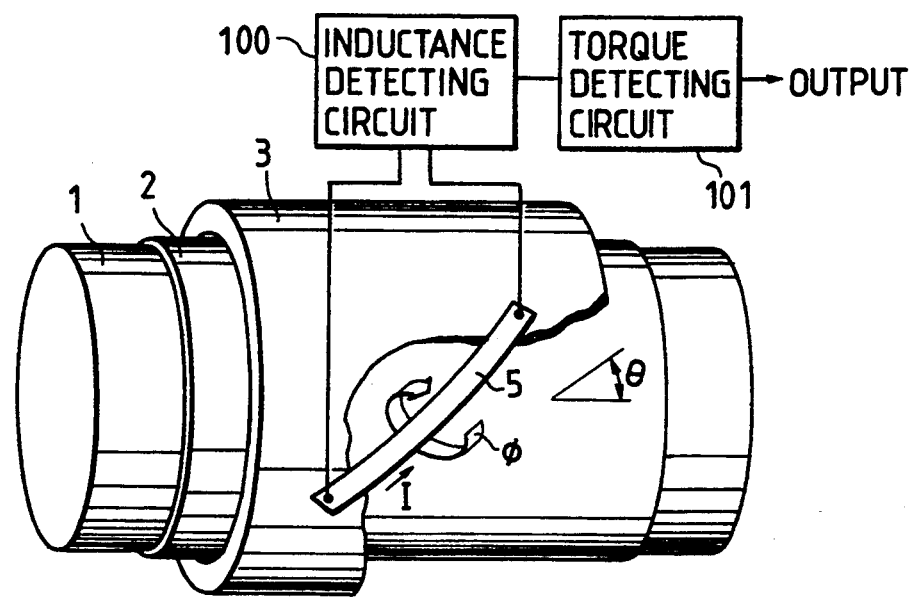
FIG. 1 is a partial perspective view showing the torque detector according to Embodiment 1 of the present invention.

When the torque detector of the invention receives an external torque on the driven shaft, a main stress develops on the surface of the driven shaft in the directions of $\theta = \pm 45°$ and a tensile component of the stress works in one direction of either $\theta = +45°$ or $\theta = -45°$ whereas a compressive component of the stress works in the other direction.

When the stress develops, the permeability in the magnetostrictive area will change. An inductor is provided around the driven shaft as it is spaced by a predetermined gap from the shaft and the current path composing this inductor is provided to point in the direction in which inductance changes in response to the change in permeability; therefore, the magnetic flux that is generated around the inductor's current path by the corkscrew rule when a current (ac) is allowed to flow through the current path is influenced by the change in permeability which occurs in the direction of the main stress (i.e., the stress developing in the directions of $\theta = \pm 45°$) in the magnetostrictive area of the driven shaft. Permeability is a function of the torque applied to the driven shaft and the inductance of the inductor is proportional to the amount of magnetic flux generation per unit current; therefore, the torque as applied to the driven shaft can be determined by detecting the inductance of the inductor with the inductance detecting circuit.

The torque detector of the invention has an inductor that is provided on a cylindrical plane that is spaced by a predetermined gap from the surface of the driven shaft and which is composed of a current path that points in the direction in which inductance changes in response to the aforementioned change in permeability. Since this current path composing the inductor is supplied with a bias current (dc), magnetic flux is generated around the current path in an amount that is related both to the permeability of the surface of the driven shaft in the direction of the main stress and to the bias current. If an adequately large current is allowed to flow through the drive coil in the state just described above, a sufficiently large flux will be generated along the axis of the driven shaft to saturate the magnetic flux that already developed on the surface of the driven shaft on account of such phenomena as the change in permeability, eventually leading lowering the effective permeability of the surface of the driven shaft. As a consequence, the inductance of the inductor decreases to reduce the magnetic flux that passes through the inductor, whereupon a voltage is induced in the inductor by the electromotive force that corresponds to the drop in inductance. The induced voltage is related to the permeability that occurred on the surface of the driven shaft in the direction of the main stress line before the current was supplied through the drive coil; in order words, the induced voltage is related to the stress and, hence, the magnitude of the torque as applied to the driven shaft can be determined by measuring the voltage induced in the inductor. Thus, according to the invention, torque detection can be achieved without providing strips of magnetic members on the surface of the driven shaft.

The torque detector or the torque detecting element of the invention has an inductor assembly consisting of a first and a second inductor, which are each composed of current paths that point in the directions in which inductance changes in response to the change in permeability that occurs in the two directions of main stress line that develops on the surface of the driven shaft due to the torque it receives. When an ac current is admitted through the current paths in the respective inductors, inductance will change in opposite directions and, hence, the magnitude of the torque that was applied to the driven shaft can be determined by taking the difference between the two values of inductance. If a dc bias current is supplied through the current paths, magnetic flux is generated around the inductors in accordance with the permeability in the two directions of main stress line but upon impression of a current through the drive coil, that magnetic flux is saturated and a voltage is induced in each inductor. In this case, the magnitude of the torque as applied to the driven shaft can be determined by taking the difference between the voltages induced in the respective inductors.

More specifically, it should first be noted that the permeability of the surface of the driven shaft in the magnetic field that is generated by a current path in a given direction is equal to the permeability of the surface of the driven shaft in the magnetic field that is generated by a current path offset by 180° from the given direction. Thus, in response to a stress that developed in the direction of $\theta = -45°$, the inductance of the current path pointing in the direction of 45° will change in the same direction as the inductance of the current path pointing in the direction of 225°. Therefore, by combining these two current paths, a first inductor can be constructed for the particular purpose of detecting the stress that develops in the direction of $\theta = -45°$. Similarly, a second inductor for detecting the stress that develops in the direction of $\theta = +45°$ can be constructed by combining two current paths, one pointing in the direction of $-45°$ and the other in the direction of $-225°$. If one takes the difference between the values of stress that are determined from the two units of inductor, he can produce an output that is compensated for the effects of disturbances to reflect only the applied torque. In addition, unlike the prior art torque detector, the device recited in claim 4 or 10 capable of detecting the changes in stress that occurred in axially the same position and, hence, it is less vulnerable to the effects of disturbances such as an axial temperature gradient, unbalanced external magnetic field and residual magnetic flux.

Furthermore, in the invention, both the first and the second inductors require that the current paths be connected together in areas where they are offset in direction by 180° and the current paths for establishing connection will generate unwanted inductances. If nothing is done with this phenomenon, it will contribute to an error in torque measurement; however, in each of the first and second inductors of the invention under consideration, the current paths for establishing connection substantially overlap with each other and they are connected in such a way that an ac current or a bias current will flow in opposite directions and, taken as a whole, the current flowing in one current path is canceled by the current flowing in the other and the net magnetic field that is generated is practically zero; hence, the generation of unwanted inductance is suppressed to a low enough level that will cause no significant detection errors.

Moreover, in the invention, the inductor is composed of a plurality of inductor elements that are arranged at equal distances on a circular plane that is spaced by a predetermined gap from the surface of the driven shaft. This arrangement is effective in reducing the error that may develop if the driven shaft is eccentric.

In the torque detector of the invention, furthermore, a current path providing pattern is formed on a flexible substrate and an inductor is composed by placing this flexible substrate on a circular plane that is spaced by a predetermined gap from the magnetostrictive surface of the driven shaft. Thus, the construction of the inductor is simple enough to achieve cost reduction.

Furthermore, in the invention, a cylindrical yoke is provided exterior to the inductor or outside the inductor and the drive coil; this offers the advantage that even if the current path is formed of a short pattern, the necessary inductance can be insured from the inductor which hence has a higher sensitivity and is less vulnerable to the effects of external magnetic field.

Torque detectors according to several embodiments of the present invention are described below with reference to FIGS. 1 to 9.

Embodiment 1

FIG. 1 shows a torque detector according to the first embodiment of the invention. It comprises: a driven shaft 1 which is a rotating shaft; a magnetic member 2 that is secured in a cylindrical form to the circumferential surface of the driven shaft 1 and which is made of a layer of magnetostrictive material; a bobbin 3 that is provided rotatably around the driven shaft and which is supported by bearings (not shown); an inductor 5 that is provided on the bobbin 3, that has a current path pointing in the direction of angle $\theta = 45°$ with respect to the driven shaft and which is spaced by a certain gap from the surface of the magnetic member 2; an inductance detecting circuit 100 that is connected to the inductor 5 not only for causing an ac current to flow in the inductor but also for detecting the inductance of the inductor 5; and a torque computing circuit 101 connected to the inductance detecting circuit 100.

The inductor 3 is typically formed of a good conductor such as a copper wire.

The torque detector shown in FIG. 1 operates as follows. If a torque is externally applied to the driven shaft 1, a stress will develop in the directions of main stress line that are inclined by $\theta = \pm 45°$ from the center axis of the magnetic member 2; as a result, the magnetic characteristic of the magnetic member 2 becomes anisotropic and its permeability in the direction of $\theta = +45°$ will change in an opposite sense to the permeability in the direction of $\theta = -45°$. If a current is then caused to flow in the current path of the inductor 5, which is positioned at the angel 45° with respect to the center axis of the driven shaft 1, a magnetic field H is created around the current path at an angle of $\theta = -45°$ in accordance with the corkscrew rule and, obviously, the direction of this magnetic field H is parallel to the main stress occurring in the direction of $-45°$. The magnetic flux $\phi$ generated by the field H is a function of the permeability of the magnetic member 2 in the direction of $\theta = -45°$ (as expressed by $B = \mu H$, where B is the density of flux $\phi$ and $\mu$ is the permeability). The inductance of the inductor is proportional to the amount by which flux $\phi$ is generated per unit current I (as expressed by $L = \phi/I$, where L is the inductance). Hence, if one detects the inductance of the inductor with the inductance detecting circuit 100 and if he outputs a torque-dependent voltage V on the basis of the corrective calculation made in the torque computing circuit 101, he can determine the torque that was applied to the driven shaft 1. To summarize the foregoing description, the application of an external torque to the driven shaft 1 causes a stress to develop in the magnetic member 2 in the directions of main stress line that are inclined by $\theta = \pm 45°$ from the center axis of the driven shaft 1; the resulting anisotropy in the magnetic characteristic of the magnetic member 2 causes its permeability in the direction of $\theta = +45°$ to change in an opposite sense to the permeability in the direction of $\theta = -45°$; hence, one may well say that the inductor 5 is composed of a current path that points in the direction in which inductance changes in response to the change in permeability at the surface of the driven shaft 1 due to the torque it received.

As described above, the current path of the inductor 5 in the first embodiment of the present invention is disposed to point in the direction in which the inductance of the inductor will change in response to the change in the permeability of the magnetic member 2 due to the torque received by the driven shaft, especially in the direction inclined by 45° from the center axis of the driven shaft in which the greatest change in inductance occurs in response to the change in permeability that takes place in the direction inclined by $-45°$ from the center axis under the stress exerted in that direction; because of this arrangement, the embodiment under consideration enables torque detection to be accomplished in an effective manner on the basis of the change in inductance.

As a further advantage of this embodiment, the inductor 5 is provided with directivity so that the magnetic member 2 need not be formed in strips but can be secured in a cylindrical form around the driven shaft 1. Therefore, the process of manufacturing the torque detector can be simplified and any inconveniences such as the high likelihood of strip separation and corrosion that would otherwise occur if the magnetic member were formed as a plurality of strips can be eliminated, with the added advantage of a smaller gap between the magnetic member 2 and the inductor 5.

Embodiment 2

In the torque detector of embodiment 1, the inductor 5 is composed of a single current path that points in the direction inclined by 45° with respect to the driven shaft 1 but this is rather a simplified picture of the present invention and with only one current path, the inductance of the inductor 5 is so small as to introduce substantial difficulty in its detection. Hence, in practice, the detection of a main stress in one direction requires the use of multiple current paths in such directions that they are sensitive to the effect of the main stress.

Figure 2:
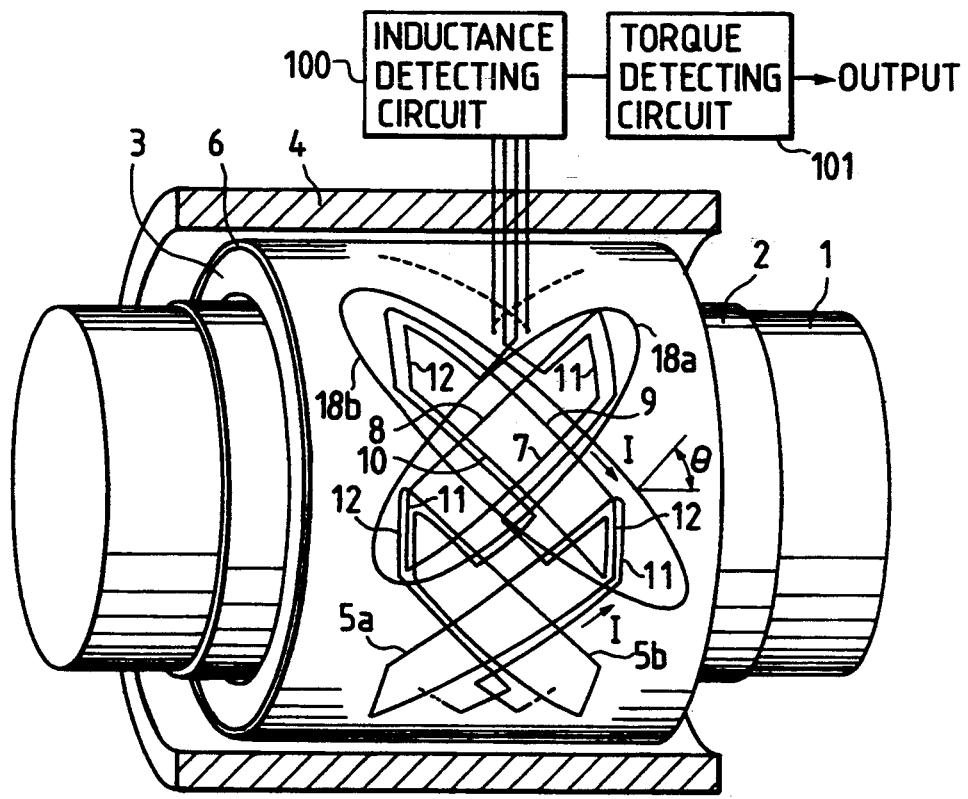
FIG. 2 is a partial perspective view showing the torque detector according to Embodiment 2 of the present invention.

A specific example of the case where this requirement is met is shown in FIG. 2 as Embodiment 2. In this embodiment, a flexible substrate 6 typically made of a polyimide resin has a parallelogram inductor element 18a formed on it. The inductor element 18a consists of the combination of a first current path 7 pointing in the direction of 45° and a second current path 8 pointing in the opposite direction of 225° (both current paths are for detecting a stress in the direction of $\theta = -45°$), as well as connecting current paths 11 pointing in the directions of $\theta = 90°$ and $\theta = 270°$ for connecting the current paths 7 and 8 as they are spaced from each other. A plurality of such combinations are arranged at equal distances and connected in series to compose a first inductor 5a. Similarly, a parallelogram inductor element 18a is formed on the substrate and it consists of the combination of a third current path 9 pointing in the direction of $-45°$ and a fourth current path 10 pointing in the opposite direction of $-225°$ (both current paths are for detecting a stress in the direction of $\theta = 45°$), as well as connecting current paths 12 pointing in the directions of $\theta = -90°$ and $\theta = -270°$ for connecting the current paths 9 and 10 as they are spaced from each other. A plurality of such combinations are also arranged at equal distances and connected in series to compose a second inductor 5b. This is how the torque detecting element is composed in Embodiment 2. Shown by 4 in FIG. 2 is a yoke provided around the flexible substrate 6 in order to prevent the leakage of magnetic flux out of the element.

The first and second inductors 5a and 5b are disposed in such a way that they are superposed in substantially the same axial position and, furthermore, the connecting current paths 11 and 12 are disposed in such a way that they substantially overlap with each other at both ends of the first to the fourth current paths 7 to 10.

Let us describe how the torque detector of the embodiment under consideration operates. When a torque is applied externally to the driven shaft 1, anisotropy develops in the magnetic characteristic of the magnetic member 2, whereupon the inductance of the first inductor 5a changes in an opposite direction to the inductance of the second inductor 5b. Thus, magnetic flux is generated in the first inductor 5a in response to the change in the permeability of the magnetic member 2 in the direction of $-45°$ whereas magnetic flux is generated in the second inductor 5b in response to the change in the permeability of the magnetic member 2 in the direction of 45°. The inductance detecting circuit 100 detects the inductances as related to the magnetic flux generated in the two inductors. On the basis of the difference taken between the outputs from the inductors 5a and 5b, the torque computing circuit 101 calculates the torque that was applied to the driven shaft 1 and outputs a torque-dependent voltage V with any effects of disturbances having been properly canceled.

In Embodiment 2, both inductors 5a and 5b are provided in the substrate 6 and this offers the advantage of a simple design for providing the first inductor 5a and the second inductor 5b in axially the same area, whereby the change in the permeability of the magnetic member 2 can be detected with two inductors in the same position, making it possible to perform torque detection with reasonable guarding against various disturbances such as an axial temperature gradient, unbalanced external magnetic field and residual magnetic flux.

Further, a plurality of inductor elements 18a and 18b are arranged at equal distances on a circular plane that is spaced by a predetermined gap from the surface of the driven shaft. This arrangement is effective in reducing the error that may develop if the driven shaft is eccentric.

One may suspect that the current path 11 for connecting the first and second current paths 7 and 8, as well as the current path 12 for connecting the third and fourth current paths 9 and 10 can potentially cause adverse effects on the precision of detection. However, this is not the case for the embodiment under consideration in which the connecting current paths 11 and 12 are disposed to substantially overlap with each other and in which current will flow in opposite directions in those overlapping portions; thus, taken as a whole, the current flowing in the path 11 is canceled by the current flowing in the path 12 and the net magnetic field that is generated is practically zero and, hence, the generation of unwanted inductance is suppressed to a low enough level that will cause no significant detection errors.

Furthermore, any possible leakage of magnetic flux is prevented by the yoke 4 and this insures inductance of the necessary intensity for torque detection even if the inductors are composed of short patterned current paths.

Embodiment 3

Figure 3:
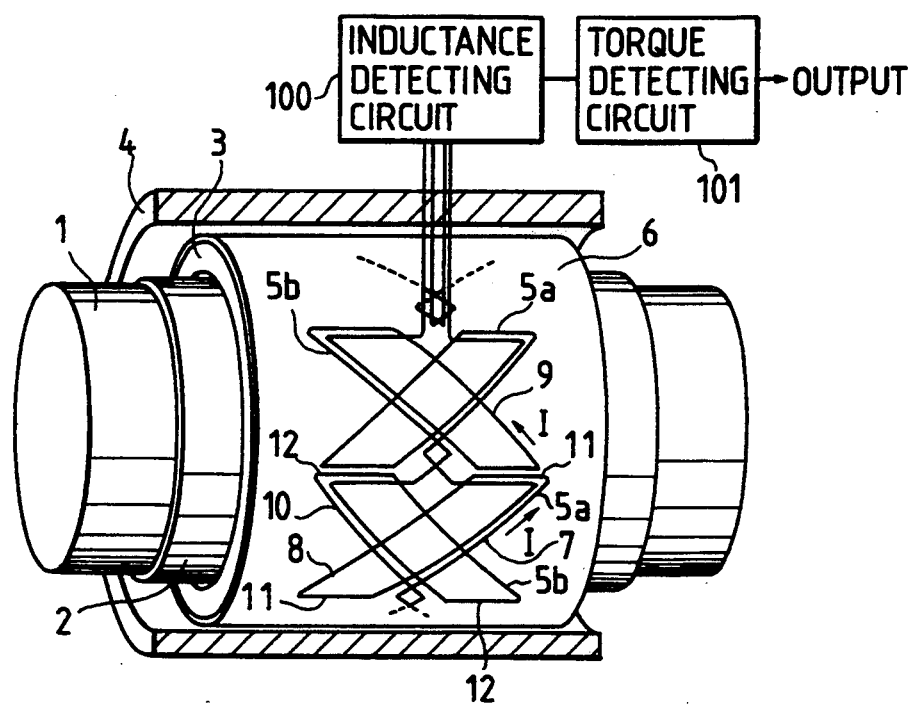
FIG. 3 is a partial perspective view showing the torque detector according to Embodiment 3 of the present invention.

In Embodiment 2, the connecting current path 11 of the first inductor 5a points in the directions of $\theta = 90°$ and $\theta = 270°$ whereas the connecting current path 12 of the second inductor 5b point in the directions of $\theta = -90°$ and $\theta = -270°$. If desired, the two connecting current paths may be designed to point in other directions as shown in FIG. 3, in which the connecting current path 11 of the first inductor 5a points in the directions of $\theta = 180°$ and $\theta = 0°$ whereas the connecting current path 12 of the second inductor 5b points in the directions of $\theta = 0°$ and $\theta = 180°$. This arrangement will produce the same result as in Embodiment 2.

Embodiment 4

In FIGS. 2 and 3, each of the parallelogram plane coil elements that compose the first and second inductors 5a and 5b is shown to consist of 1.5 turns for the specific purpose of providing a clear picture of the connection of current paths. However, in practice, more turns of coil are preferably employed in order to increase the inductance and, hence, improve the precision of measurement.

Figure 4:
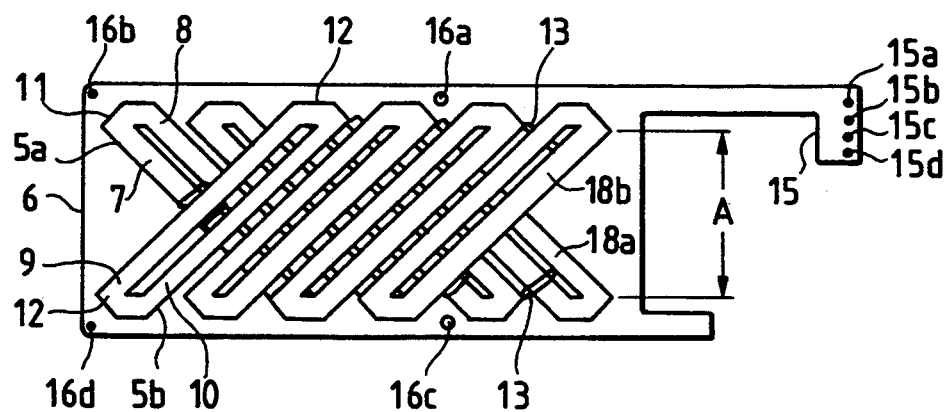
FIG. 4 is a front view showing a torque detecting element of such a type that the inductor of the torque detector according to Embodiment 4 of the present invention is provided on a flexible substrate.
Figure 5:
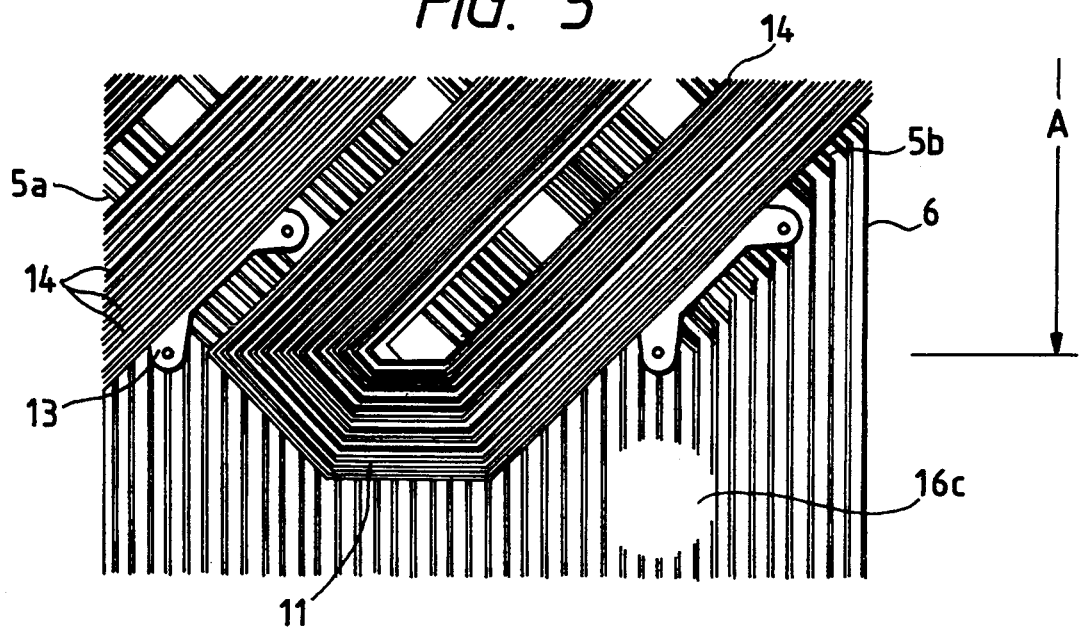
FIG. 5 is a partial enlarged view of the torque detecting element shown in FIG. 4.

A specific example of the case where this condition is satisfied is shown in FIGS. 4 and 5. FIG. 4 shows a torque detecting element in which a substrate 6 composed of two flexible layers is provided with a first inductor 5a on the reverse side and a second inductor 5b on the front side. The first inductor 5a consists of four elements 18a and the second inductor 5b also consists of four elements 18b. Only the contours of these inductor elements are shown in FIG. 4 (note that the substrate 6 used in the embodiment under discussion is transparent so that the first inductor 5a on the back side can be seen through the substrate).

The inductor elements 18a and 18b are partly shown enlarged in FIG. 5; a copper wire 14 is wound in 14 turns for each inductor element to produce a sufficient intensity of inductance that enables the intended torque detection. As already mentioned, the first inductor 5a consists of the first and second current paths 7 and 8 which are arranged within the area A, and the connecting current path 11 which is arranged outside the area A (although not shown in FIG. 5). The individual elements of the first inductor 5a are interconnected by connecting portions 13. The connecting current path 11 is not solely composed of the portion that points in the directions of $\theta=90°$ and $\theta=270°$; in order to insure that it will overlap with the connecting current path 12 of the second inductor 5b in more areas, the current path 11 has an additional portion that points in the directions of $\theta=135°$ and $\theta=315°$. The second inductor 5b is composed in the same manner.

The substrate 6 which has the inductors provided in the way just described above provides a torque detecting element which is mounted either on the outer circumference of the bobbin 3 or on the inner circumference of the yoke 4. An example of the mounting of substrate 6 is shown in FIG. 6; in the case shown in FIG. 6, the bobbin 3 is not provided and the substrate 6 is mounted and secured on the inner circumference of the yoke 4.

Figure 6:
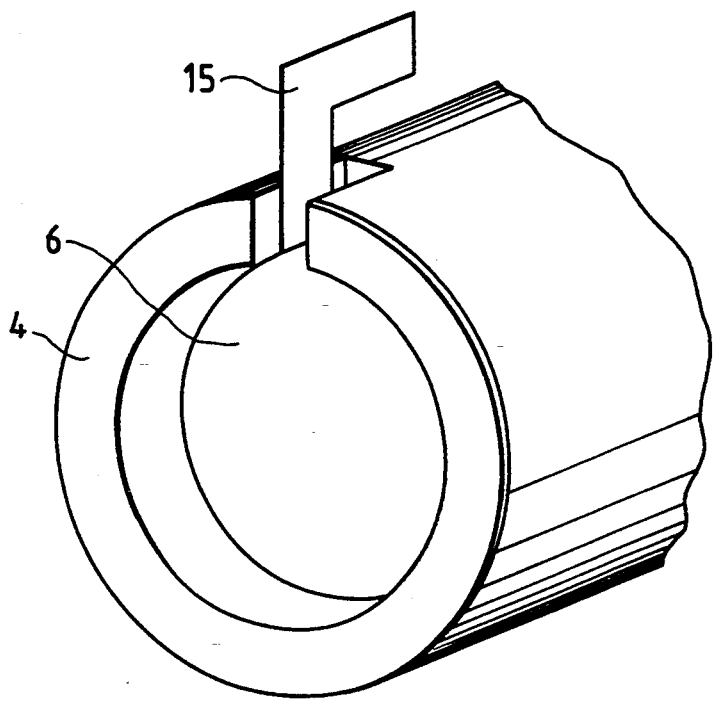
FIG. 6 is a perspective view showing a torque detecting element of such a type that the inductor of the torque detector according to Embodiment 4 of the present invention is mounted on the inner side of the yoke.

The driven shaft 1 is to be secured to the inner side of each inductor by means of beatings but in FIG. 6 the shaft is yet to be assembled. Shown by 16a to 16d in FIG. 4 are holes that assist in fixing the substrate 6 to the yoke 4 and when mounting the substrate in a cylindrical form, those holes are brought into mutual registry in such a way that holes 16a and 16b overlap each other whereas holes 16c and 16d will overlap. If this condition is met, the connecting current paths 11 and 12 that are provided on the substrate 6 and which do not overlap in the flat state will come to overlap each other on the cylindrical plane, causing the inductor elements 18 and 18b to be arranged at equal distances over the cylindrical surface. A terminal portion 15 is formed at an end of the substrate 6 and it has four terminals 15a to 15d; two of these terminals are connected to the first inductor 5a and the other two are connected to the second inductor 5b. The terminal portion 15 projects to the outside of the yoke 4 through a cutout as shown in FIG. 6.

The construction described above is also capable of torque detection with satisfactory precision.

Embodiment 5

In each of the embodiments described above, an ac current is allowed to flow in the inductor 5 and the inductance of this inductor as it changes in response to the change in the permeability of the magnetic member 2 due to the torque that was applied to the driven shaft 1 is detected with the impedance detecting circuit 100 so as to detect the applied torque. This approach needs only the inductor and the detection circuit as the essential components for torque detection and, hence, has the advantage of being able to achieve torque detection with a simple construction; however, it still has a practical problem as described below. The current path that composes the inductor has an inherent resistance and when an ac current is supplied into this inductor, ac voltage is caused by the resistance of the current path and this voltage is taken into the inductance detecting circuit as well as the ac voltage caused by the inductance of the inductor. Since it is difficult to subtract this component of the ac current alone, the result of inductance detection has unavoidably included an error that corresponds to the inherent resistance of the current path. The amount of this error has been particularly great when a thin wire is used as the current path.

Figure 7:
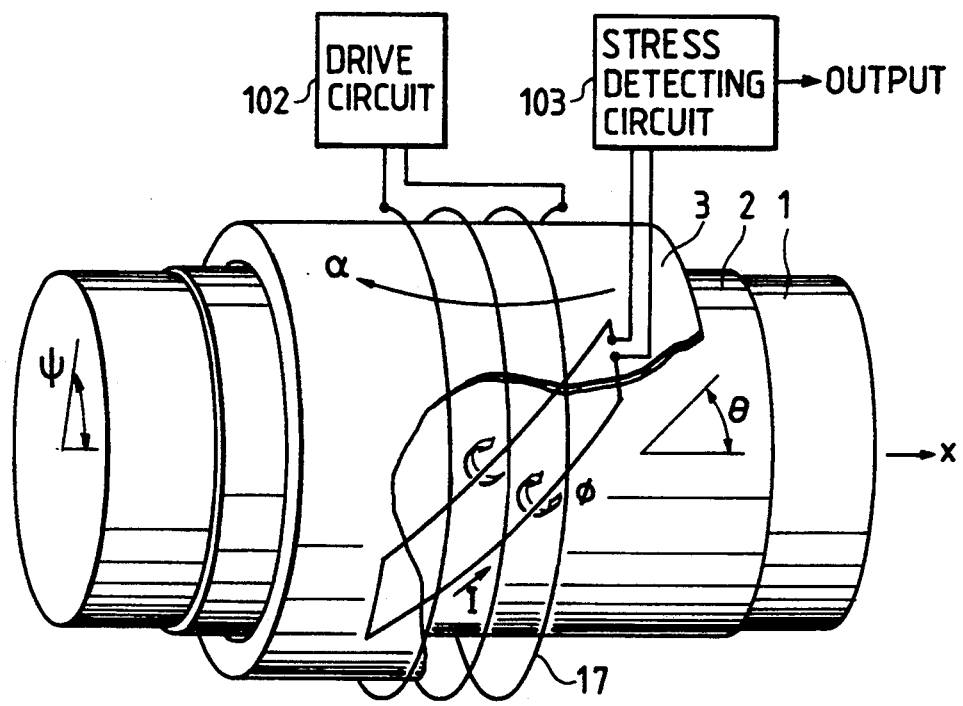
FIG. 7 is a partial perspective view showing the torque detector according to Embodiment 5 of the present invention.

Embodiment 5 is a torque detector that is adapted to deal with this problem. As shown in FIG. 7, the detector has the following additional components: a drive coil 17 that is wound onto the bobbin 3 and hence the driven shaft 1; a drive circuit 102 for supplying a current to the drive coil 17; and a stress detecting circuit 103 that replaces the inductance detecting circuit 100 and torque detecting circuit 101 which are used in Embodiments 1 to 4. The stress detecting circuit 103 comprises a means for supplying a dc bias current to the inductor, a means for detecting the voltage developing in the inductor, and a means for computing the applied torque on the basis of the detected voltage. The other components of the torque detector shown in FIG. 7 are identical to those of the device of Embodiment 1 and need not be described in detail.

The torque detector of Embodiment 5 operates in the following manner. The stress detecting circuit 103 supplies a predetermined bias current I (dc) to the current path of the inductor 5. By the corkscrew rule, the applied bias current I will generates a magnetic field H around the current path in the direction of $-45°$. As in the case of Embodiment 1, the magnetic flux $\phi$ that is generated by the field H is a function of the permeability of the magnetic member 2 in the direction of $\theta=-45°$ and the inductance L of the current path composing the inductor 5 is a function of the flux $\phi$ that is generated by the current I. If an external torque is applied to the driven shaft 1, a stress consisting of a tensile and a compressive component will develop in the magnetic member 2 in two directions as inclined by $\pm 45°$ from the center axis of the driven shaft 1, whereupon anisotropy occurs in the magnetic characteristic of the magnetic member 2. As a result, the permeability of the magnetic member 2 in the direction of $\theta=45°$ and that in the direction of $\theta=-45°$ will change in opposite directions and the flux $\phi$ as well as the inductance L will change accordingly. However, the bias current I is a dc current, so even if the flux $\phi$ around the inductor 5 changes in response to the above-mentioned change in permeability, there will be no corresponding voltage induction that can be detected by the stress detecting circuit 103.

This problem is solved as follows in Embodiment 5. With the inductor 5 generating magnetic flux $\phi$, the drive circuit 102 supplies an adequately large current to the drive coil 17, which then generates a sufficiently large flux $\alpha$ along the axis of the driven shaft 1 to saturate the flux $\phi$ around the magnetic member 2. If the flux $\phi$ is saturated, the effective permeability of the magnetic member 2 will decrease, whereupon the inductance of the inductor 5 drops to reduce the flux $\phi$ passing through the inductor 5, whereby an electromotive force is applied to the inductor 5 to induce voltage. The induced voltage is related to the permeability of the magnetic member 2 in the direction of main stress line that occurred before current was supplied to the drive coil, namely, it is related to the stress; therefore, by measuring the induced voltage with the stress detecting circuit 103, one can determine the magnitude of the torque as applied to the driven shaft 1. In the case under consideration, an ac current is kept supplied to the drive coil 17 so that the value of the current flowing in the drive coil 17 is changed periodically from zero to a maximum, whereby the flux $\alpha$ is cyclically reduced to zero or increased to a reasonably large level so as to perform cyclic torque detection. But this is not the sole case of the present invention and a separate dc current source may be operated in such a way that the period of current impression on the drive coil 17 alternates with the period of non-impression.

As in Embodiment 1, the torque detector of Embodiment 5 has directivity in the inductor and, hence, the magnetic member 2 need not be provided in a strip form as in the prior art but it can be secured to the cylindrical plane on the circumference of the driven shaft 1; this not only contributes to a simplified manufacturing process but also eliminates any inconveniences such as the high likelihood of strip separation and corrosion that have accompanied the use of magnetic members in strip form.

In Embodiment 5, a dc bias current is applied to the inductor but, at the same time, a current is impressed on the drive coil 17 to cause flux saturation and the resulting decrease in inductance induces a sufficient voltage in the inductor to be detected. Since the induced voltage is a dc voltage, the effect of the inherent resistance of the current path composing the inductor can be easily eliminated to assure correct torque detection.

Embodiment 6

Figure 8:
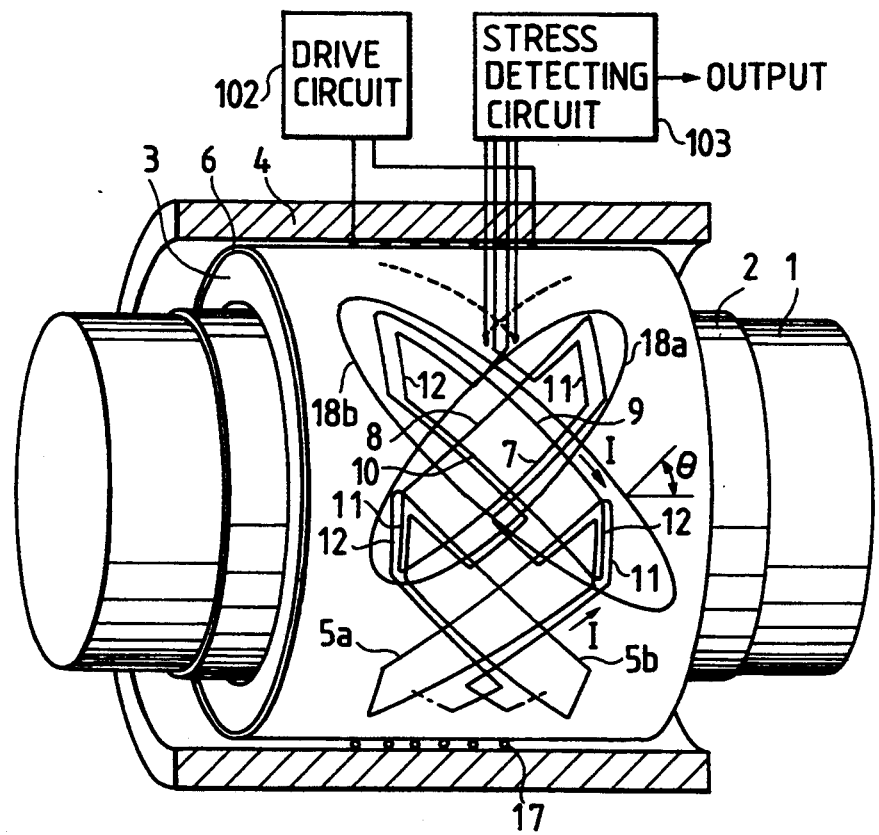
FIG. 8 is a partial perspective view showing the torque detector according to Embodiment 6 of the present invention.

Embodiment 5 can be modified to a more practical version as in Embodiment 6 which is illustrated in FIG. 8. The construction of Embodiment 6 is essentially the same as that of Embodiment 2 except for the drive coil 17, drive circuit 102 and the stress detecting circuit 103 and explanation of the components that are common to the two embodiments is omitted.

The torque detecting operation to be performed in this embodiment is basically the same as in Embodiment 5. As in Embodiment 2, the torque detector shown in FIG. 8 has an inductor assembly that consists of two-directional inductors 5a and 5b, which are each composed of a plurality of elements (inductor 5a is composed of elements 18a whereas inductor 5b is composed of elements 18b). The inductor elements 18a and 18b are disposed on the flexible substrate 6 in such a way that the inductors 5a and 5b are substantially superposed on each other in the axial direction; this offers the advantage of simple construction and yet a sufficient amount of voltage to permit correct torque detection can be induced in the inductor assembly and, in addition, any adverse effects of disturbances such as an axial temperature gradient can be effectively canceled to assure correct torque detection. Further, a plurality of inductor elements 18a and 18b are arranged on the cylindrical plane that is spaced by a predetermined gap from the surface of the driven shaft 1 and, hence, there is less likelihood of the occurrence of errors due to the possible eccentricity of the driven shaft. Another feature of the embodiment under consideration is that the connecting current paths 11 and 12 are disposed in such a way that they substantially overlap with each other and, hence, any adverse effects these current paths will cause on the results of torque detection can be eliminated.

Embodiment 7

Figure 9:
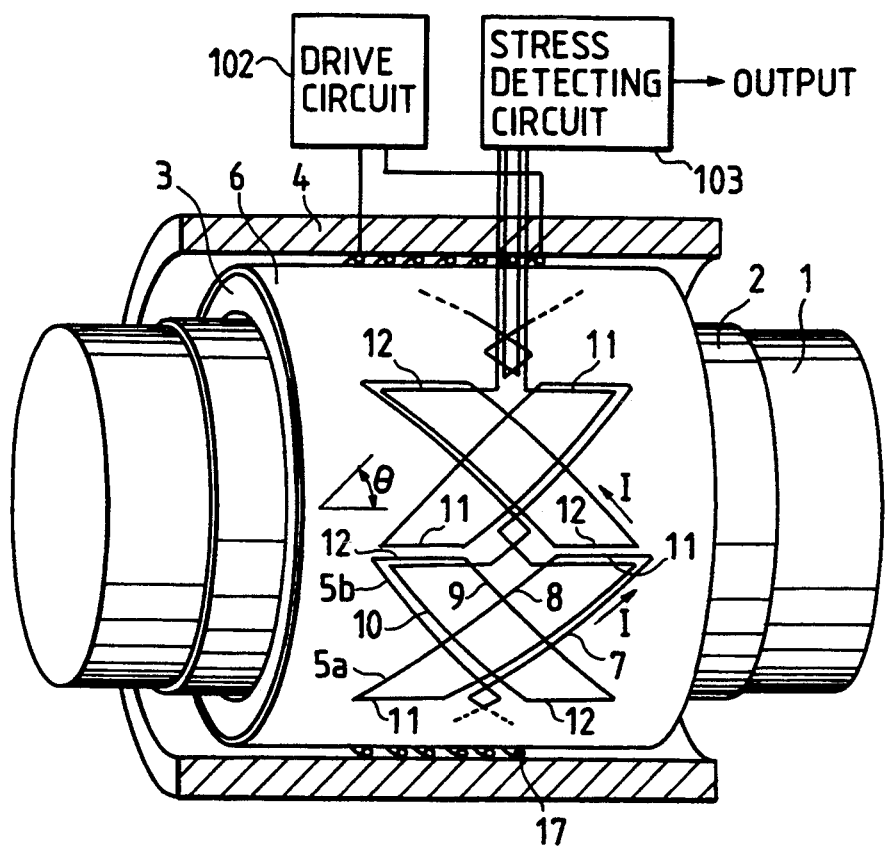
FIG. 9 is a partial perspective view showing the torque detector according to Embodiment 7 of the present invention.
Figure 10:
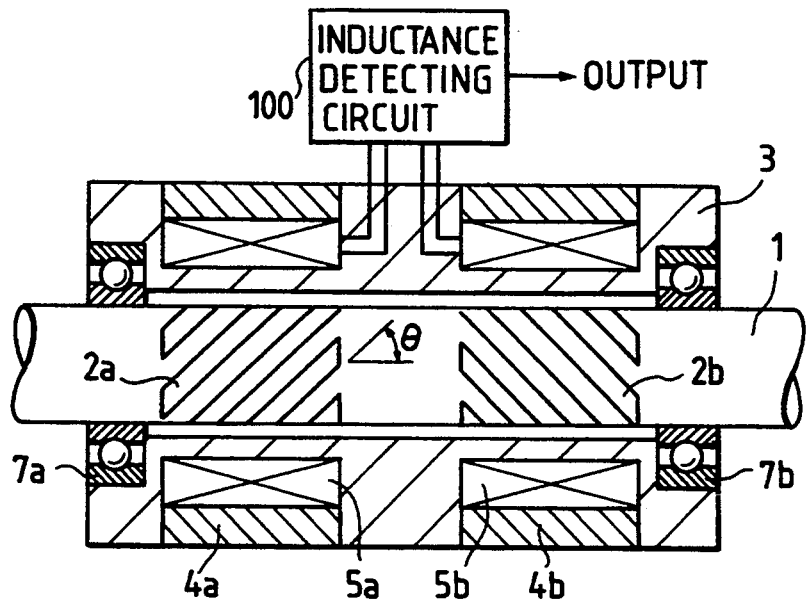
FIG. 10 is a partial fragmentary side view showing a prior art torque detector.

FIG. 9 shows a torque detector according to Embodiment 7 of the present invention. The construction of this detector is essentially the same as in Embodiment 3 except for the drive coil 17, drive circuit 102 and stress detecting circuit 103. The operation and advantages of the detector are the same as in Embodiment 6 and hence explanation of these aspects is omitted.

Embodiment 8

The inductor assembly that was described in Embodiment 4 with reference to FIGS. 4 to 8 can also be used in Embodiments 5 to 7 and this modification may be referred to as Embodiment 8. While the construction of the inductor assembly that can be substituted is essentially the same as described in Embodiment 4, the inductor assembly to be especially used in Embodiment 8 under consideration has the drive coil 17 provided around the inductor; hence, in order to hook up the substrate 6 having the inductor assembly formed thereon, the substrate 6 is first rolled about itself to form a cylindrical plane that is slightly smaller than the inner circumference of the yoke 4 and after winding the drive coil 17 around the cylindrical substrate 6, the substrate 6 is inserted into the yoke 4 and secured to its inner circumference.

In Embodiments 5 to 8, the waveform of the current to be applied to the drive coil 17 may be such that the magnetic flux it generates will shift the B–H characteristic of the magnetic member 2 from a region where linearity is maintained (the region where H, or magnetic field, changes in a predetermined manner in response to the change in B, or magnetic flux) to a nonlinear region (where the B–H characteristic deviates from the predetermined profile) and a state that is substantially equivalent to the saturation of magnetic flux around the driven shaft 1 can be created in the nonlinear region. Examples of the waveform that can produce this effect include continuous pulsed wave, sine wave, triangular wave, etc.

In Embodiments 5 to 8, a bias current is supplied to the inductor and this bias current may be supplied from a constant voltage source or, alternatively, a current that varies in synchronism with the current to be applied to the drive coil 17 may be supplied as a bias current. In Embodiments 5 to 8, the voltage that is induced in the current path of the inductor is detected but, if desired, the current that is induced in that current path may be detected.

It should be emphasized here that the torque detectors described in Embodiments 4 and 8 were actually constructed by the present inventors and found to operate normally.

If, in the embodiments described above, one is unduly particular about the angle the current path of inductor 5 forms with the driven shaft 1, the dimensional aspect ratio of inductor 5 or substrate 6 is so much limited as to reduce the degree of freedom in design; hence, the direction in which the current path is to point may deviate within the range of ±45° (exclusive) from the direction that is perpendicular to the main stress line (the direction in which the permeability of the magnetic member will change).

In all of the cases described herein, the magnetic member 2 is secured to the surface of the driven shaft 1 but, if desired, the driven shaft 1 itself may be formed of a magnetostrictive material.

The torque detector or torque detecting element of the present invention offers various advantages as described below.

In the torque detector of the invention, the inductor is provided on a cylindrical plane that is spaced by a predetermined gap from the surface of the driven shaft and the inductor is composed of a current path that points in the direction in which its inductance will change in response to the torque received by the driven shaft, namely, in the direction which is generally perpendicular to the direction of main stress line on the surface of the driven shaft, whereby the applied torque can be detected on the basis of the change in the inductance of the inductor. Further, in the torque detector of the invention, a bias current is preliminarily impressed on the inductor and a current is then supplied to the drive coil wound around the driven shaft, whereupon a current or voltage is induced in the inductor by a sufficient amount that permits correct detection. In either type of detector, the construction is simplified enough to enable manufacture by a straightforward process.

Furthermore, in the invention, an inductor assembly consisting of the first and second inductors may be provided in such a way that the two inductors are superposed in axially the same position, and this makes it possible to construct a torque detector that is less vulnerable to the effects of disturbances such as an axial temperature gradient, unbalanced external magnetic field and residual magnetic flux.

If the first and second inductors are disposed in such a way that their connecting conductive paths overlap each other to permit the passage of current in opposite directions, the generation of unwanted inductance in the overlapping portions is reduced to a low enough level that will not cause any significant detection errors.

According to the invention, the inductor is composed of a plurality of elements that are arranged on a circular plane that is spaced by a predetermined gap from the surface of the driven shaft and this arrangement can effectively reduce the error that will occur if the driven shaft is eccentric.

If the inductor is provided on a flexible substrate, the procedures of the work for fabricating and mounting the inductor are facilitated. Furthermore, the yoke is provided around the inductor and this insures that a desired inductance can easily be produced from a short patterned current path.

What is claimed is:

1. A torque detector comprising:
a driven shaft having a magnetostrictive portion;
a first inductor provided on a cylindrical surface that is concentrically disposed at a predetermined distance from a surface of the magnetostrictive driven shaft, said inductor having a first current path and a second current path, said first current path being linear on the cylindrical surface and directed at an angle of 45° with respect to a central axis of the driven shaft, said second current path pointing in a direction opposite to that of said first current path, said first current path and said second current path being electrically connected to each other and said first current path and said second current path being spaced from each other by a certain distance;
an inductance detecting circuit for detecting an inductance of the first inductor.

2. A torque detector according to claim 1, including a second inductor symmetric to the first inductor, said second inductor having a third current path and a fourth current path, said third current path pointing in a direction of −45° with respect to a central axis of the driven shaft, said fourth current path pointing in a direction opposite to that of said third current path, said first and second inductors being superposed in substantially the same axial position, each of said first and second inductors comprising a plurality of inductor elements, said inductor elements of each inductor being arranged at equal distances on the cylindrical surface, and such that areas of connection between said first and second current paths of said first inductor substantially overlap areas of connection between said third and fourth current paths of said second inductor, so that current will flow in opposite directions in said first and second inductors in those portions where said areas of connection overlap each other.

3. A torque detector according to claim 1, wherein the inductor has a pattern for providing a current path, said pattern being formed on a flexible substrate and being provided on a cylindrical surface that is concentrically disposed at a predetermined distance from that portion of the driven shaft which has been rendered magnetostrictive.

4. A torque detector according to claim 1 wherein a cylindrical yoke is provided on the outer side of the inductor.

5. A torque detector comprising:
a driven shaft having a magnetostrictive portion;
an inductor provided on a cylindrical surface that is concentrically disposed at a predetermined distance from a surface of the magnetostrictive driven shaft, said inductor having a first current path and a second current path, said first current path being linear on the cylindrical surface and pointing in a direction of 45 degrees with respect to a central axis of the driven shaft, said second current path pointing in a direction opposite to that of said first current path, said first current path and said second current path being electrically connected to each other, said first current path and said second current path being spaced from each other by a certain distance;
means for supplying a bias current to said inductor to generate magnetic flux in the magnetostrictive portion of said driven shaft;
a drive coil wound around the driven shaft;
means for applying a current to said drive coil to saturate a magnetic flux generated by said inductor; and
a detecting circuit for detecting a current or voltage occurring in said inductor as a result of impression of a current on said drive coil.

6. A torque detector according to claim 5, wherein said inductor comprises a first and a second inductor, said first inductor having linear current paths that are directed in a direction in which inductance changes in response to change in permeability that occurs in a first direction of a main stress line that develops on a surface of the driven shaft due to a torque which said shaft receives, and said second inductor having linear current paths which are directed in a direction in which inductance changes in response to a change in permeability that occurs in a direction of a second main stress line that develops on the surface of the driven shaft due to the torque the driven shaft receives, said first and second inductor being placed in such a way that they are superposed in substantially the same axial position.

7. A torque detector according to claim 5, wherein said inductor comprises a first and a second inductor, said first inductor having a first current path and a second current path that are electrically connected to each other, said first current path and said second current path being spaced apart from each other by a certain distance, said first current path pointing in a direction of 45° with respect to a central axis of the driven shaft, which is a direction in which inductance changes in response to a change in permeability that occurs along a main stress line that develops in a direction of −45° with respect to a central axis of the driven shaft on the surface of the driven shaft due to the torque it receives when said torque detecting element is placed around that portion of the driven shaft which has been rendered magnetostrictive, said second current path pointing in a direction opposite to that of said first current path, said second inductor comprising a third current path and a fourth current path that are electrically connected to each other and are spaced apart from each other by a certain distance, said third current path pointing in a direction of −45° with respect to the central axis of the driven shaft, which is the direction in which inductance changes in response to a change in permeability of the driven shaft that occurs along a main stress line that develops in a direction of +45 degrees with respect to the central axis of the driven shaft on the surface of the driven shaft due to the torque which the driven shaft receives, said fourth current path pointing in a direction opposite to that of said third current path, said first and second inductor being superposed in substantially the same axial position and in which areas of connection between said first and second current paths substantially overlap areas of connection between said third and fourth current paths, so that a current will flow in opposite directions in said first and second inductors in those portions wherein said areas of connection overlap each other.

8. A torque detector according to claim 5, wherein the inductor comprises a plurality of inductor elements the inductances of which vary in the same direction in response to the change in permeability that occurs on the surface of the driven shaft in the directions of the first and second main stress lines, respectively, and in which said inductor elements are arranged at equal distances on a cylindrical surface that is concentrically disposed at a predetermined distance from the surface of the driven shaft.

9. A torque detector according to claim 5, wherein the inductor has a pattern for providing a current path, said pattern being formed on a flexible substrate, and in which said pattern is provided on a cylindrical surface that is concentrically disposed at a predetermined distance from that portion of the driven shaft which has been rendered magnetostrictive.

10. A torque detector according to claim 5, wherein a cylindrical yoke is provided on the outer side of the inductor and the drive coil.

11. A torque detecting element having an inductor assembly formed on a substrate, said inductor assembly comprising:

a driven shaft having a magnetostrictive portion;

a first and a second inductor, said first inductor having linear current paths that are directed in a direction in which inductance changes in response to a change in permeability that occurs in a first direction of a main stress line that develops on a surface of said driven shaft due to a torque which said shaft receives, and said second inductor having linear current paths which are directed in a direction in which inductance changes in response to a change in permeability that occurs in a second direction of a main stress line that develops on the surface of the driven shaft due to a torque the driven shaft receives when said torque detecting element is placed around that portion of the driven shaft which has been rendered magnetostrictive and in which said first and second inductor are placed in such a way that they are superposed in substantially the same axial position.

12. A torque detecting element according to claim 11, wherein said first inductor has a first current path and a second current path that are electrically connected to each other and said first current path and said second current path are spaced apart from each other by a certain distance, said first current path pointing in a direction of 45° with respect to a central axis of the driven shaft, which is a direction in which inductance changes in response to a change in permeability that occurs along a main stress line that develops in a direction of −45° with respect to a central axis of the driven shaft on the surface of the driven shaft due to the torque the driven shaft receives when said torque detecting element is placed around that portion of the driven shaft which has been rendered magnetostrictive, said second current path pointing in a direction opposite to that of said first current path, said second inductor comprising a third current path and a fourth current path that are electrically connected to each other and are spaced apart from each other by a certain distance, said third current path pointing in a direction of −45° with respect to the central axis of the driven shaft, which is the direction in which inductance changes in response to a change in permeability of the driven shaft that occurs along a main stress line that develops in a direction of +45 degrees with respect to the central axis of the driven shaft on the surface of the driven shaft due to the torque which the driven shaft receives, said fourth current path pointing in a direction opposite to that of said third current path, said first and second inductor being superposed in substantially the same axial position such that areas of connection between said first and second current paths substantially overlap areas of connection between said third and fourth current paths, so that a current will flow in opposite directions in said first and second inductor in those portions wherein said areas of connection overlap each other.

13. A torque detecting element according to claim 11, wherein said inductor consists of a plurality of inductor elements, the inductances of which vary in the same direction in response to the change in permeability that occurs on the surface of the driven shaft in the directions of the first and second main stress lines due to the torque the shaft receives when said torque detecting element is placed around that portion of the driven shaft which has been rendered magnetostrictive, and said inductor elements being arranged at equal distances on the substrate.

14. A torque detecting element according to claim 11 which is secured to the inner side of a cylindrical yoke.

15. A torque detecting element according to claim 11, further including securing means for securing said torque detecting element to the inner side of a yoke, a drive coil being wound onto the outer side of said torque detecting element, and further comprising means for applying a current to said drive coil to compensate for a resistance of the inductor assembly.

* * * * *